Feb. 22, 1966  J. ZAGÓRSKI  3,236,530
BOTTOM RING OF STUFFING BOXES FOR PISTONS AND PISTON
RODS OF HIGH-PRESSURE ENGINES AND THE LIKE
Filed Feb. 18, 1963                                           2 Sheets-Sheet 1

Inventor:
Johannes Zagórski
By Michael S. Striker
Attorney

United States Patent Office 3,236,530
Patented Feb. 22, 1966

3,236,530
BOTTOM RING OF STUFFING BOXES FOR PISTONS AND PISTON RODS OF HIGH-PRESSURE ENGINES AND THE LIKE
Johannes Zagórski, Titlgasse 14, Vienna, Austria
Filed Feb. 18, 1963, Ser. No. 259,039
7 Claims. (Cl. 277—68)

High pressure piston pumps, plunger pumps or high pressure compressors up to 300 atü employ slot rings of leather or plastics, or of synthetic rubber reinforced with cottom fabric, for sealing purposes.

These machines perform up to 500 operations per minute; the clearance between the piston rod respectively and the bottom ring serving for the guidance of the piston rod is some millimeters so as to allow a rapid pressure action on the edge of the slot ring. This arrangement has the following disadvantages:

The alternating pressure of the liquid or the gas arising in the cylinder and propagating in the clearance along the piston rod produces an upsetting effect on the edge of the slot ring which eventually deforms the latter. If in the pressureless state the edge does not fit tightly to the piston rod, this deformation is even more pronounced because of the upsetting effect of the pressure on the edge of the slot ring. A further disadvantage is that, owing to the large clearance between the piston rod and the bottom ring, and taking into account the usual length of the stuffing boxes, a bad guidance of the reciprocating machine parts results. If once the piston rod begins to wander transversely to its axis, the slot ring will be very rapidly deformed. A further disadvantage is that the slot ring adheres to the piston rod under the heavy pressure so that, when changing the motion of the piston rod the slot ring is greatly strained, this strain increasing with a rising number of strokes/min.

The invention aims at eliminating these disadvantages as much as possible in order to obtain a longer life for the packing. The essential feature of the invention is to conduct the pressure liquid through large bore holes or elongated holes of the bottom ring, a communicating round or oval annular channel, and a communicating annular slot formed by the bottom ring and by a sealing lip of a juxtaposed slot ring in such a way that the edge of the sealing lip is pressed against piston rod, this same pressure liquid reacting in an opposite direction to the pressure liquid in the clearance between the piston rod and the bottom ring through the annular channel on the slot ring, and gradually running out to the extreme edge. Thus the pressure liquid penetrating through the annular slot also compensates for the upsetting effect of the pressure liquid coming from the clearance between the piston rod and the bottom ring.

The annular channel and the annular slot are dimensioned in such a way that there will be no throttling whereas the clearance between the piston rod and the bottom ring, which is in the order of about 0.03 to 0.04 mm., will result in a strong throttling of the pressure of the liquid passing through the clearance. For the purpose of a strong throttling the clearance space is extended as long as possible, forming at the same time a good guidance for the piston rod. The length of the bore holes or the elongated holes of the bottom ring, on the other hand, must be as small as possible in order to produce a rapid compensating effect with each change of pressure on the pressure of the liquid in the clearance.

It is advantageous to give the annular slot an inclination of 45° to 20° and less to the piston rod, especially when the slot ring is made of metal. When the slot ring is made of plastics the inclination may be greater.

The slot rings are made of metals with high gliding quality, or of alloys. Additionally, lubricating of the piston rod with cylinder oil is provided so that sticking of the slot ring to the piston rod is avoided. Also, the oil film produces an additional throttling of the pressure of the liquid in the clearance.

The bottom ring may be of one piece together with the stuffiing box case, or may be arranged separately. In the first case the ready mounted stuffiing box is screwed, e.g. into the cover of a high-pressure pump, and can therefore readily be changed. In the second case the stuffing box is provided, e.g. in the cover of pump or high pressure. Bottom ring and slot rings are placed in position and fastened with the gland.

At the most two slot rings should be employed, of which the one facing the cylinder should provide a sufficient seal, the second slot ring only serving as reserve.

The drawing shows examples of the execution of the invention.

Figure 3:
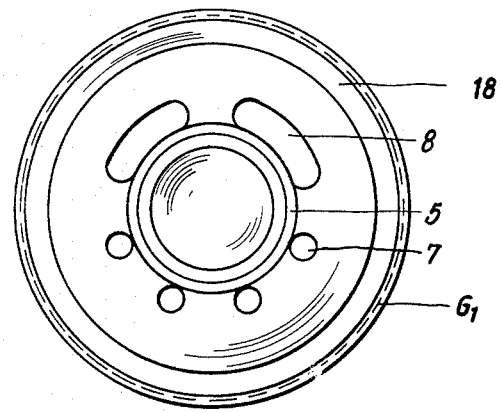
FIG. 3 is a view of the bottom ring 5 seen from the cylinder.

On a frame 1, e.g. of a high pressures pump, a cylinder flange 2 is secured by screwing it thereto. Numeral 3 is the piston rod of the pump. Into the cylinder flange 2 a casing 4 of a stuffiing box has been screwed by means of a fine-pitch thread $G_1$. The stuffing box casing 4 forms one piece with the first or bottom ring 5; however, the part 4 may also form one piece with the cylinder flange 2. In this case the bottom ring 5 is a separate piece and is screwed in separately as is shown by the broken line 6. The bottom ring 5 has eight to ten bore holes 7, or four elongated holes 8 according to FIG. 3, which open into an annular channel 9 which is oval in cross-section of the width $b$. Moreover, the bottom ring 5 has a long guidance or projection for the piston rod 3 and extending into the pump cylinder 10 having the diameter $D_z$. Together with the piston rod 3 this guidance forms the guide clearance, the width of which is about 0.03 to 0.04 mm. according to the diameter. The annular channel 9 of the width $b$ is formed by the bottom ring 5 and a second or slot ring 11 (of steel- or aluminum alloy, bronze or some other metal of high expansion, or of plastics) having a rounded groove 18. The edge of the slot ring forms under an angle $\alpha$ with respect to axis of the piston rod and together with the corresponding opposite wall of the bottom ring, a non-throttling annular slot $S_1$ respectively its projection $S_1'$, opening to the piston rod.

The course of the pressure liquid from the cylinder 10 through the bore holes 7, or the elongated holes 8, respectively, into the annular channel 9 and into the annular slot $S_1$ is shown by the plotted arrowed line. The slot ring 11 has a groove 12 which makes the edge more elastic. The slot ring 11 is fastened in the stuffing box by means of the gland 13 and a fine-pitch thread $G_2$.

For lubricating 14 thick cylinder oil must be chosen. Four bore holes 15 serve to receive a box spanner for adjusting the stuffing box gland 13.

Figure 1:
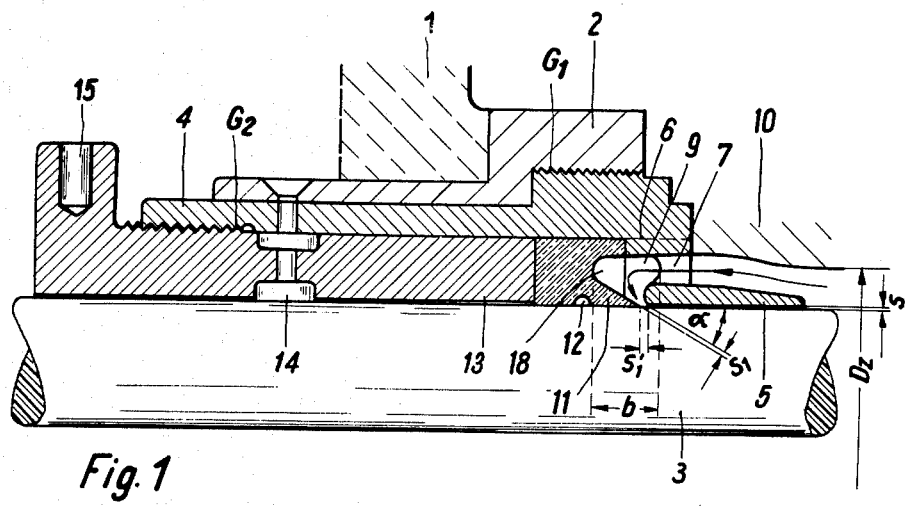
FIG. 1 shows a partial section through a stuffing box with one slot ring.
Figure 2:
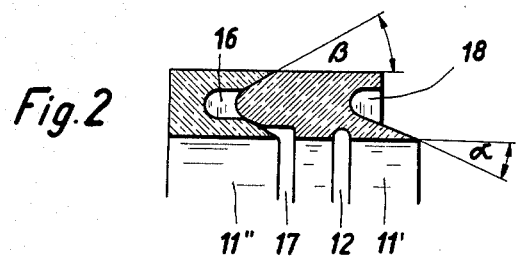
FIG. 2 is a partial section through a double slot ring.
Figure 4:
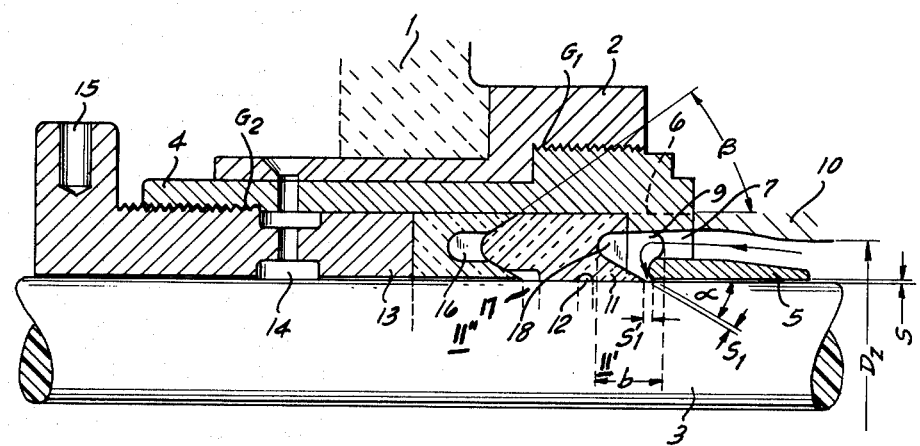
FIG. 4 is a view similar to FIG. 1, but having the double slot ring of FIG. 2.

In FIGS. 2 and 4 two slot rings 11' and 11" placed one behind the other are shown. Both edges of the slot ring 11" are bevelled with an angle β. The slot ring 11" additionally has a groove 16 which makes the edge especially elastic. The slot ring 11' has the usual turned groove 12 and also a longish groove 17 into which the inner edge of the slot ring 11" projects. Thus the edge is capable of elastic free play and cannot exercise any effect on the piston rod. The rear terminating planes of the slot ring 11' are bevelled with an angle β and rounded towards the middle. The edge of slot ring 11' is inclined under an angle α gradually changing over to the rounded groove 18, which forms one part of the annular channel 9. With its flat part the slot ring 11' sits tightly on the bottom ring 5.

The angles α and β are about 45° to 20° and less according to the lesser or greater solidity of the material of the slot rings.

The invention is useful especially for high-pressure pumps, but also for valve boxes which are subject to strong and rapid changes of pressure.

What I claim is:

1. In combination with a cylinder member defining a pressure space adapted to be filled with pressure fluid and another member cooperating with said cylinder member and arranged coaxially therewith and movable relative thereto, said members having respectively cylindrical surfaces spaced from and facing each other, a sealing arrangement for preventing pressure fluid to pass through the space between said cylindrical surfaces of said members and comprising a first ring coaxially fixed to one of said members and having a cylindrical surface facing and spaced from the cylindrical surface of the other member by a small clearance, one end face facing said pressure space and an opposite end face, said first ring being formed with a plurality of axial passages therethrough extending between said end faces thereof and communicating at one of the ends thereof with said pressure space; a second ring abutting with cylindrical faces thereof against said cylindrical surfaces of said members, respectively, and with an end face thereof against said opposite end face of said first ring, said rings being formed in said abutting end faces thereof with complementary grooves defining a channel open at one side toward the cylindrical surface of said other member and communicating with said passages, said second ring having an integral flexible lip extending beyond said end face thereof partly across said open side of said channel to define at said open side of said channel a narrow annular slot directed toward said small clearance so that pressure fluid may pass through said passages and said channel through said slot to counteract any flow of pressure fluid through said clearance, while said sealing lip will be resiliently pressed against the cylindrical surface of said other member, whereby passage of pressure fluid beyond said sealing arrangement is prevented; and holding means for holding said second ring in abutting relationship against said first ring.

2. In combination with a cylinder member defining a pressure space adapted to be filled with pressure fluid and a piston rod member cooperating with said cylinder member and arranged coaxially therewith and movable relative thereto, said members having respectively cylindrical surfaces spaced from and facing each other, a sealing arrangement for preventing pressure fluid to pass through the space between said cylindrical surfaces of said members and comprising a stuffing box coaxially fixed to said cylinder member; a first ring coaxially fixed to said stuffing box and having an inner cylindrical surface facing and spaced from the cylindrical surface of the piston rod member by a small clearance, one end face facing said pressure space and an opposite end face, said first ring being formed with a plurality of axial passages therethrough extending between said end faces thereof and communicating at one of the ends thereof with said pressure space; a second ring abutting with cylindrical faces thereof against cylindrical surfaces of said stuffing box and said piston rod, respectively, and with an end face thereof against said opposite end face of said first ring, said rings being formed in said abutting end faces thereof with complementary grooves defining a channel open at one side toward the cylindrical surface of said piston rod and communicating with said passages, said second ring having an integral flexible lip extending beyond said end face thereof partly across said open side of said channel to define at said open side of said channel a narrow annular slot directed toward said small clearance so that pressure fluid may pass through said passages and said channel through said slot to counteract any flow of pressure fluid through said clearance, while said sealing lip will be resiliently pressed against the cylindrical surface of said piston rod member, whereby passage of pressure fluid beyond said sealing arrangement is prevented; and holding means connected to said stuffing box for holding said second ring in abutting relationship against said first ring.

3. The combination as set forth in claim 2, wherein said first ring has an annular projection projecting from said end face thereof into said pressure space and having an inner cylindrical surface forming a continuation of said inner cylindrical surface of said first ring.

4. The combination as set forth in claim 2, wherein said sealing lip ends in a sharp edge.

5. The combination as set forth in claim 4, wherein said sealing lip has an inner face defining part of said channel and being inclined at an angle of 20–45° to the axis of said piston rod member.

6. The combination as set forth in claim 4, wherein said second ring has opposite said abutting end face thereof an annular projection tapering in cross-section away from said abutting end face, and including a third ring having cylindrical faces respectively engaging said cylindrical surfaces of said members, said third ring being formed in an end portion thereof facing said annular projection of said second ring with an annular groove defined in part by a pair of oppositely inclined faces engaged by said tapering annular projection of said second ring so that fluid pressure in said channel will tend to move said second ring in tight engagement with said third ring to press thereby said tapering annular portion of said second ring into said groove of said third ring pressing thereby cylindrical face portions at said one end portion thereof in tight engagement with said cylindrical surfaces of said members, respectively.

7. In combination with a cylinder member defining a pressure space adapted to be filled with pressure fluid and a piston rod member cooperating with said cylinder member and arranged coaxially therewith and movable relative thereto, said members having respectively cylindrical surfaces spaced from and facing each other, a sealing arrangement for preventing pressure fluid to pass through the space between said cylindrical surfaces of said members and comprising a suffing box coaxially fixed to said cylinder member; a first ring coaxially fixed to said stuffing box and having an inner cylindrical surface facing and spaced from the cylindrical surface of the piston rod member by a small clearance, one end face facing said pressure space and an opposite end face, said first ring being formed with a plurality of straight passages therethrough extending between said end faces thereof and communicating at one of the ends thereof with said pressure space; a second ring abutting with cylindrical faces thereof against cylindrical surfaces of said stuffing box and said piston rod, respectively, and with an end face thereof against said opposite end face of said first ring, said rings being formed in said abutting end faces thereof with complementary annular grooves defining a channel open at one side toward the cylindrical surface of said piston rod and said passages in such a manner that fluid entering said channel through said passages will be smoothly deflected in an annular path, said second ring having an integral flexible lip extending beyond said end face thereof partly across said open side of said channel to define at said open side of said channel a narrow annular slot directed toward said small clearance so that pressure fluid may pass through said passages and said channel through said slot to counteract any flow of pressure fluid through said clearance, while said sealing lip will be resiliently pressed against the cylindrical surface of said piston rod member, whereby passage of pressure fluid beyond said sealing arrangement is prevented; and holding means connected to said stuffing box for holding said second ring in abutting relationship against said first ring.

References Cited by the Examiner

UNITED STATES PATENTS

| | | | |
|---|---|---|---|
| 1,945,151 | 1/1934 | Marsh | 277—124 |
| 2,007,501 | 7/1935 | Millmine | 277—27 |
| 2,584,513 | 2/1952 | Summers | 277—70 |
| 2,802,706 | 8/1957 | Adams | 277—32 |

FOREIGN PATENTS 533,526  2/1941  Great Britain.

LAVERNE D. GEIGER, *Primary Examiner.*

SAMUEL B. ROTHBERG, *Examiner.*